(12) United States Patent
Lee (10) Patent No.: US 12,503,114 B2
(45) Date of Patent: Dec. 23, 2025

(54) APPARATUS AND METHOD FOR CONTROLLING AUTOMATIC LANE CHANGE OF VEHICLE

(71) Applicants: Hyundai Motor Company, Seoul (KR); Kia Corporation, Seoul (KR)

(72) Inventor: Jong Hyuck Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 278 days.

(21) Appl. No.: 17/745,530

(22) Filed: May 16, 2022

(65) Prior Publication Data

US 2023/0043586 A1    Feb. 9, 2023

(30) Foreign Application Priority Data

Aug. 9, 2021    (KR) ........................ 10-2021-0104743

(51) Int. Cl.
| | |
|---|---|
| *B60W 30/18* | (2012.01) |
| *B60K 35/10* | (2024.01) |
| *B60K 35/22* | (2024.01) |
| *B60W 50/14* | (2020.01) |
| *G01C 21/00* | (2006.01) |

(52) U.S. Cl.
CPC ....... *B60W 30/18163* (2013.01); *B60K 35/10* (2024.01); *B60K 35/22* (2024.01); *B60W 50/14* (2013.01); *B60W 2050/146* (2013.01); *B60W 2420/403* (2013.01); *B60W 2520/10* (2013.01); *B60W 2555/60* (2020.02); *B60W 2556/40* (2020.02); *G01C 21/3815* (2020.08)

(58) Field of Classification Search
CPC .......... B60W 30/18163; B60W 50/14; B60W 2050/146; B60W 2420/403; B60W 2520/10; B60W 2555/60; B60W 2556/40; B60W 2556/50; B60W 30/146; B60W 40/02; B60W 40/105; B60W 2720/10; G01C 21/3815; B60K 2360/1446; B60K 2360/731; B60K 35/10; B60K 35/65; B60K 35/00; B60K 35/22; G08G 1/167
See application file for complete search history.

(56) References Cited

U.S. PATENT DOCUMENTS 9,672,734 B1 * 6/2017 Ratnasingam ... G08G 1/096741
2019/0317522 A1 * 10/2019 Yang ..................... G05D 1/0278

FOREIGN PATENT DOCUMENTS

CN           109050533 B  * 11/2020  ............ B60W 10/06

* cited by examiner

*Primary Examiner* — Anne Marie Antonucci
*Assistant Examiner* — Jewel Ashley Kuntz
(74) *Attorney, Agent, or Firm* — Fox Rothschild LLP (57) ABSTRACT

An apparatus and method for controlling an automatic lane change of a vehicle in consideration of a speed limit are configured to obtain information about the speed limit of a road from map information including information about the speed limit of the road, and calculate a speed at which an automatic lane change function is operable based on the speed limit of the road. As a result, it is possible to control the automatic lane change of the vehicle while automatically complying with laws and/or regulations in consideration of the speed limit of the road.

14 Claims, 7 Drawing Sheets

APPARATUS AND METHOD FOR CONTROLLING AUTOMATIC LANE CHANGE OF VEHICLE

CROSS-REFERENCE TO RELATED APPLICATION

This application claims under 35 U.S.C. § 119(a) the benefit of Korean Patent Application No. 10-2021-0104743, filed in the Korean Intellectual Property Office on Aug. 9, 2021, the entire contents of which are incorporated herein by reference.

BACKGROUND

(a) Technical Field

The present disclosure relates to an apparatus and method for controlling an automatic lane change of a vehicle, more particularly, to the apparatus and method for controlling the automatic lane change in consideration of a speed limit.

(b) Description of the Related Art

Highway driving assist 2 (HDA2) is a technology including cruise control and lane change assistance functions. The cruise control function is configured to maintain driving of a vehicle while keeping the speed of the vehicle constant. The lane change assist function refers to a function in which the vehicle autonomously performs a lane change in a direction corresponding to a turn signal when a driver activates a turn signal light while the cruise control operates.

A minimum operating speed capable of performing the lane change function may be determined by law and/or regulation in relation to a maximum speed limit. In general, when the maximum speed limit of a road is high, the minimum operating speed at which the lane change function can be performed may be set high, and when the maximum speed limit of the road is low, the minimum operating speed at which the lane change function can be performed may be set low. Accordingly, it is necessary to develop a technology for varying the minimum operating speed capable of performing a lane change function in consideration of the maximum speed limit of a driving road in a vehicle system.

SUMMARY

An aspect of the present disclosure provides an apparatus and method for controlling an automatic lane change capable of controlling the automatic lane change of a vehicle in consideration of a speed limit.

Another aspect of the present disclosure provides an apparatus and method for controlling an automatic lane change capable of controlling the automatic lane change of a vehicle while automatically complying with laws and/or regulations in consideration of the maximum speed limit of a road.

Still another aspect of the present disclosure provides an apparatus and method for controlling an automatic lane change capable of displaying, for a driver, the maximum speed limit of a road and the minimum operating speed capable of performing a lane change function determined in consideration of the maximum speed limit, such that the driver recognizes the change in the minimum operating speed.

Still another aspect of the present disclosure provides an apparatus and method for controlling an automatic lane change capable of preventing a decrease in usability that may occur when the lane change function is performed without considering the maximum speed limit of a road.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling an automatic lane change includes storage that is provided in a vehicle capable of performing the automatic lane change to store map information including information on a speed limit of a road, and a controller that calculates a speed at which an automatic lane change function is operable for the road, based on the speed limit of the road.

According to an embodiment, the apparatus may further include a location information obtaining device that obtains information on a location of the vehicle, wherein the controller may control the automatic lane change of the vehicle based on the calculated speed at which the automatic lane change function is operable on the road corresponding to the location of the vehicle.

According to an embodiment, the apparatus may further include a display provided in the vehicle, wherein the controller may display the speed limit of the road corresponding to the location of the vehicle through the display.

According to an embodiment, the controller may compare a current speed of the vehicle with the calculated speed at which the automatic lane change function is operable on the road corresponding to the location of the vehicle, and determine whether the automatic lane change function is operable.

According to an embodiment, the apparatus may further include a display provided in the vehicle, wherein the controller may display, through the display, the determination of whether the automatic lane change function is operable.

According to an embodiment, the apparatus may further include a camera provided in the vehicle to obtain a surrounding image of the vehicle, wherein the controller may determine the speed limit of the road based on a sign recognized through the surrounding image.

According to an embodiment, the controller may calculate a speed at which the automatic lane change function is operable on the road, based on the speed limit of the road corresponding to the map information when being first operated.

According to an embodiment, the controller may recalculate the speed at which the automatic lane change function is operable on the road when information on the sign recognized through the surrounding image or the speed limit of the road corresponding to the map information is updated.

According to another aspect of the present disclosure, an apparatus for controlling an automatic lane change includes a camera provided in a vehicle capable of performing the automatic lane change to obtain a surrounding image of the vehicle, and a controller that recognizes a speed limit of a road on which the vehicle travels based on a sign recognized through the surrounding image, and calculates a speed at which an automatic lane change function is operable on the road based on the speed limit of the road.

According to an embodiment, the controller may control the automatic lane change of the vehicle based on the calculated speed at which the automatic lane change function is operable on the road.

According to an embodiment, the apparatus may further include a display provided in the vehicle, wherein the controller may display the speed limit of the road through the display.

According to an embodiment, the controller may compare a current speed of the vehicle with the calculated speed at which the automatic lane change function is operable on the road, and determine whether the automatic lane change function is operable.

According to an embodiment, the apparatus may further include a display provided in the vehicle, wherein the controller may display, through the display, the determination of whether the automatic lane change function is operable.

According to still another aspect of the present disclosure, a method of controlling an automatic lane change include obtaining, by a controller, information about a speed limit of a road from map information including information about the speed limit of the road stored in storage, wherein the controller is provided in a vehicle capable of performing the automatic lane change, and calculating, by the controller, a speed at which an automatic lane change function is operable based on the speed limit of the road.

According to an embodiment, the method may further include obtaining, by a location information obtaining device, information on a location of the vehicle, and controlling, by the controller, the automatic lane change of the vehicle based on the calculated speed at which the automatic lane change function is operable on the road corresponding to the location of the vehicle.

According to an embodiment, the method may further include displaying, by the controller, the speed limit of the road corresponding to a location of the vehicle through a display provided in the vehicle.

According to an embodiment, the method may further include comparing, by the controller, a current speed of the vehicle with the calculated speed at which the automatic lane change function is operable on the road corresponding to the location of the vehicle, and determining whether the automatic lane change function is operable.

According to an embodiment, the method may further include displaying, by the controller, the determination of whether the automatic lane change function is operable, through a display provided in the vehicle.

According to an embodiment, the method may further include obtaining, by a camera provided in the vehicle, a surrounding image of the vehicle, and determining, by the controller, the speed limit of the road based on a sign recognized through the surrounding image.

According to an embodiment, the calculating of the speed at which the automatic lane change function is operable may include calculating, by the controller, the speed at which the automatic lane change function is operable on the road, based on the speed limit of the road corresponding to the map information when the controller is first operated, and recalculating, by the controller, the speed at which the automatic lane change function is operable on the road when information on the sign recognized through the surrounding image or the speed limit of the road corresponding to the map information is updated.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described with reference to FIGS. 1 to 7.

Figure 1:
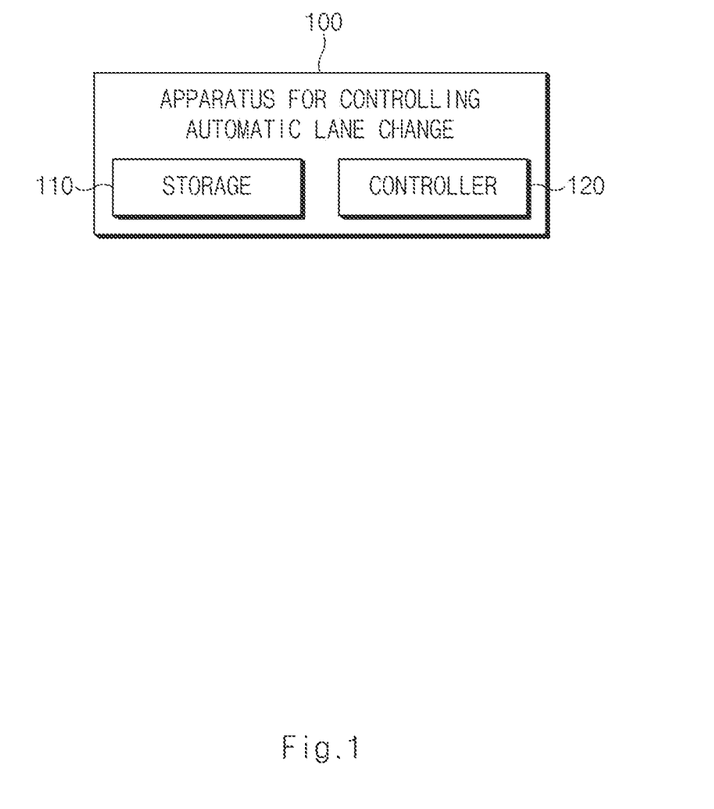
FIG. 1 is a block diagram illustrating an automatic lane change control apparatus according to an embodiment of the present disclosure.

FIG. 1 is a block diagram illustrating an automatic lane change control apparatus according to an embodiment of the present disclosure.

Referring to FIG. 1, an apparatus 100 for controlling an automatic lane change may include storage 110 and a controller 120.

The apparatus 100 for controlling an automatic lane change according to the present disclosure may be implemented inside or outside a vehicle. In this case, the apparatus 100 for controlling an automatic lane change may be integrally formed with internal control units of the vehicle, or may be implemented as a separate hardware device and connected to the control units of the vehicle through a connector.

For example, the apparatus 100 for controlling an automatic lane change may be implemented integrally with the vehicle, may be implemented in a form in which the apparatus is installed/attached to the vehicle as a configuration separate from the vehicle, or some may be implemented integrally with the vehicle, and other parts may be implemented in a form in which they are installed/attached to the vehicle as configurations separate from the vehicle.

The storage 110 may be provided in a vehicle capable of performing the automatic lane change, and may store map information including information on the speed limit of a road.

For example, the map information stored in the storage 110 may include information on the maximum speed limit for each road.

The storage 110 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

For example, the storage 110 may be configured to be connected to the controller 120 such that the controller 120 accesses the storage 110 to use the stored information In addition, the map information stored in the storage 110 may be periodically updated based on information received from a server.

The controller 120 may perform the overall control to allow each component to perform its function. The controller 120 may be implemented in hardware or software, or may be implemented in the form of a combination of hardware and software. Preferably, the controller 120 may be implemented with a microprocessor, but the embodiment is not limited thereto. In addition, the controller 120 may perform various data processing and calculations, which will be described later.

The controller 120 may calculate a speed at which the automatic lane change function can be operated on a road, based on the speed limit of the road.

For example, the controller 120 may calculate the minimum speed at which the automatic lane change function can be operated based on the maximum speed limit of the road through the formula prescribed by law and/or regulation.

Laws and/or regulations set for each country or region may be different, but as an example, the minimum speed at which the automatic lane change function can operate may be prescribed according to the following Equation 1.

$$V_{smin} = a \times (t_B - t_G) + V_{app} - \sqrt{a^2 \times (t_B - t_G)^2 - 2 \times a \times (V_{app} \times t_G - S_{rear})}$$ [Equation 1]

$V_{smin}$: Minimum operation speed of lane change function (m/s)

Where 'a' means the deceleration of an approaching vehicle, and may be, for example, 3 m/s^2. $T_B$ means a time from a time point when the lane change function starts to a time point when the deceleration of an approaching vehicle starts, and may be, for example, 0.4 s. $t_G$ means the difference in the remaining time between vehicles after the approaching vehicle decelerates, and may be 1 s for example.

In addition, $S_{rear}$ is a reference value set by a vehicle manufacturer, and may be determined as a fixed value reported based on the performance of a sensor, and may be, for example, 60 m. $V_{app}$ means the maximum speed limit, and may be determined based on the maximum speed limit of the country, region or road.

For example, when the maximum speed limit of the corresponding road is 130 km/h, the minimum speed at which the automatic lane change function for each road calculated through Equation 1 may operate may be 80 km/h.

As another example, when the maximum speed limit of the corresponding road is 110 km/h, the minimum speed at which the automatic lane change function for each road calculated through Equation 1 may operate may be 60 km/h.

For example, the controller 120 may calculate the minimum speed at which the automatic lane change function for each road is operable based on the maximum speed limit for each road included in the map information stored in the storage 110.

For example, the controller 120 may store, in the storage 110, the minimum speed at which the automatic lane change function for each road calculated corresponding to the map information is operable.

For example, the controller 120 may control the automatic lane change function based on the calculated minimum speed at which the automatic lane change function for each road is operable.

Figure 2:
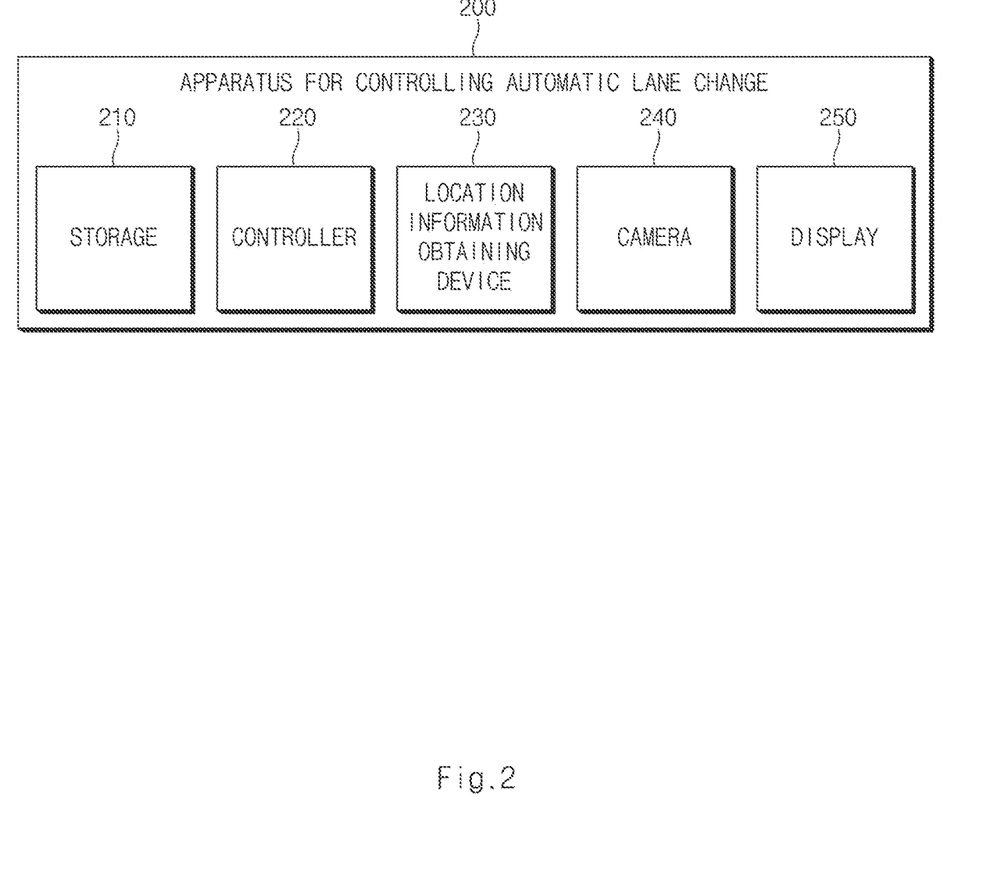
FIG. 2 is a block diagram illustrating an apparatus for controlling an automatic lane change according to another embodiment of the present disclosure.

FIG. 2 is a block diagram illustrating an apparatus for controlling an automatic lane change according to another embodiment of the present disclosure.

Referring to FIG. 2, an apparatus 200 for controlling an automatic lane change may include storage 210, a controller 220, a location information obtaining device 230, a camera 240, and a display 250.

The storage 210 and the controller 220 may correspond to the storage 110 and the controller 120 of FIG. 1, respectively, include all the features described with reference to FIG. 1, and include the features that will be described with reference to FIG. 2.

The location information obtaining device 230 may obtain information on the location of a vehicle.

For example, the location information obtaining device 230 may obtain information on the current location of the vehicle through a Global Positioning System (GPS).

In addition, the location information obtaining device 230 may be connected to the controller 220 to transmit information on the current location of the vehicle to the controller 220.

The controller 220 may control the automatic lane change based on the calculated speed at which the automatic lane change function is operable on the road corresponding to the location of the vehicle.

For example, the controller 220 determines whether the automatic lane change function is operable by comparing the current speed of the vehicle and the speed at which the automatic lane change function is operable and which is calculated with respect to the road corresponding to the location of the vehicle.

For example, the controller 220 may obtain the current vehicle speed through a vehicle system or a vehicle speed sensor, and compare the obtained current vehicle speed with the calculated speed at which the automatic lane change function is operable.

For example, when it is determined that the automatic lane change function is operable, the controller 220 may perform the automatic lane change function of the vehicle.

For example, in a state in which it is determined that the automatic lane change function is operable, the controller 220 may perform the automatic lane change in the direction corresponding to the direction indicator light when the vehicle direction indicator light is input from the user.

For example, in a state where it is determined that the automatic lane change function is not operable, the controller 220 may not perform the automatic lane change when the direction indicator light of the vehicle is input from the user.

For example, the display 250 may include a display provided in a vehicle cluster.

As another example, the display 250 may include a display or a head-up display (HUD) included in an audio, video, navigation (AVN) of a vehicle.

The controller 220 may display the speed limit of the road corresponding to the location of the vehicle through the display 250.

The controller 220 may display, through the display 250, the determining of whether the automatic lane change function is operable.

For example, the controller 220 may simultaneously display at least one of the speed limit of a road corresponding to the location of the vehicle, the speed at which the automatic lane change function is operable, or whether the automatic lane change function is operable, such that the user recognizes the changed information.

The camera 240 may be provided in the vehicle, and may obtain a surrounding image of the vehicle.

For example, the camera 240 may include at least one of a surround view monitor (SVM) camera, a digital video recording system (DVRS) camera, a camera monitor system (CMS) camera, or a lane detection camera of a vehicle.

Preferably, the camera 240 may include a camera for obtaining a front image of the vehicle, but may include a camera for obtaining a left, right or rear image of the vehicle.

For example, the camera 240 may be connected to the controller 220 to transmit information on the obtained surrounding image of the vehicle to the controller 220.

The controller 220 may determine the speed limit of the road based on the sign recognized through the surrounding image.

In this case, the sign may be located on or around the road, and may mean that information on the speed limit of the road is displayed.

For example, the controller 220 may recognize a sign indicating the speed limit of the road through image analysis based on information about the surrounding image of the vehicle received from the camera 240.

In this process, the controller 220 may recognize the sign indicating the speed limit of the road through a pre-stored image analysis algorithm, and recognize the speed limit displayed on the sign.

For example, the controller 220 may determine the maximum speed limit of the road corresponding to the current location of the vehicle through the location of the vehicle obtained from the location information obtaining device 230 and the map information stored in the storage 210, and may determine the maximum speed limit of the road corresponding to the current location of the vehicle based on the sign detected in the image obtained through the camera 240.

For example, the controller 220 may determine the maximum speed limit of the corresponding road by giving priority to one of the maximum speed limit determined based on the map information and the maximum speed limit determined based on the image.

As another example, the controller 220 may determine the maximum speed limit of the corresponding road by synthesizing the maximum speed limit determined based on the map information and the maximum speed limit determined based on the image.

For example, when first operated, the controller 220 may calculate a speed at which the automatic lane change function is operable on a road, based on the speed limit of the road corresponding to the map information Because there is no information on the sign recognized through the surrounding image during the initial operation, in this case, based on the speed limit of the road corresponding to the map information, the controller 220 may calculate the speed at which the automatic lane change function is operable on the road.

For example, when the information on the sign recognized through the surrounding image or the speed limit of the road corresponding to the map information is updated, the controller 220 may recalculate the speed at which the automatic lane change function is operable on the road.

When the controller 220 is first operated, after calculating the speed at which the automatic lane change function is operable on the road, based on the speed limit of the road corresponding to the map information, when the information on the sign is recognized through the surrounding image while driving the vehicle or the speed limit of the road is updated corresponding to the map information from the server, the controller 220 may recalculate and update the speed at which the automatic lane change function is operable on the road.

Figure 3:
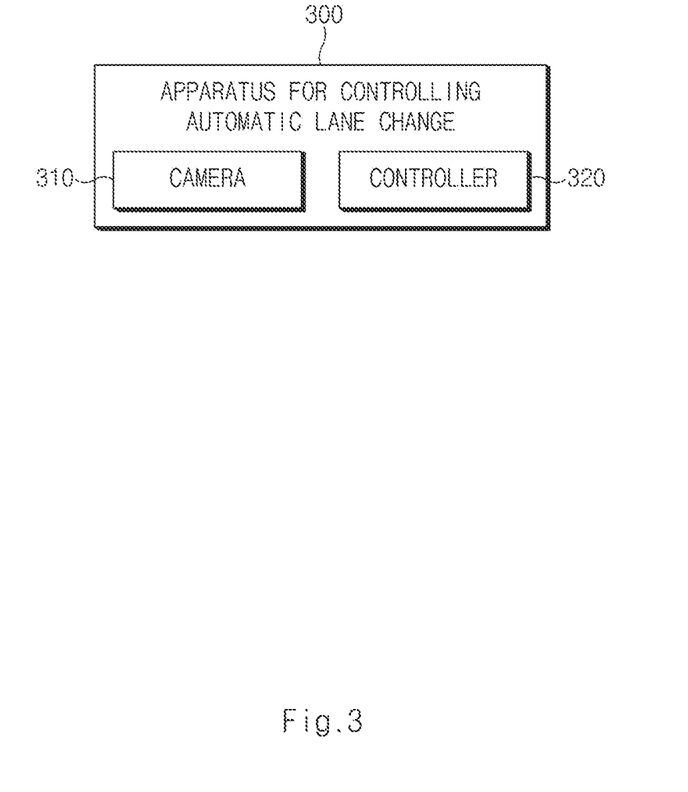
FIG. 3 is a block diagram illustrating an apparatus for controlling an automatic lane change according to still another embodiment of the present disclosure.

FIG. 3 is a block diagram illustrating an apparatus for controlling an automatic lane change according to still another embodiment of the present disclosure.

Referring to FIG. 3, an apparatus 300 for controlling an automatic lane change may include a camera 310 and a controller 320.

The camera 310 and the controller 320 correspond to the camera 240 and the controller 220 of FIG. 2, respectively, include all the features described with reference to FIG. 2, and additionally include the features that will be described with reference to FIG. 3 or changed contents.

The apparatus 300 for controlling an automatic lane change may determine the maximum speed limit of the road based on the sign of the image obtained through the camera 310 without using map information.

Accordingly, when the map information is not stored, or in a situation that cannot be updated, the apparatus 300 for controlling an automatic lane change may control the automatic lane change of a vehicle based on the maximum speed limit of the road determined through real-time images around the vehicle.

In this case, the apparatus 300 for controlling an automatic lane change may further include a display (not shown). The controller 320 may display, through the display, at least one of the speed limit of the road, the calculated speed at which the automatic lane change function is operable, or whether the determined automatic lane change function is operable.

Figure 4:
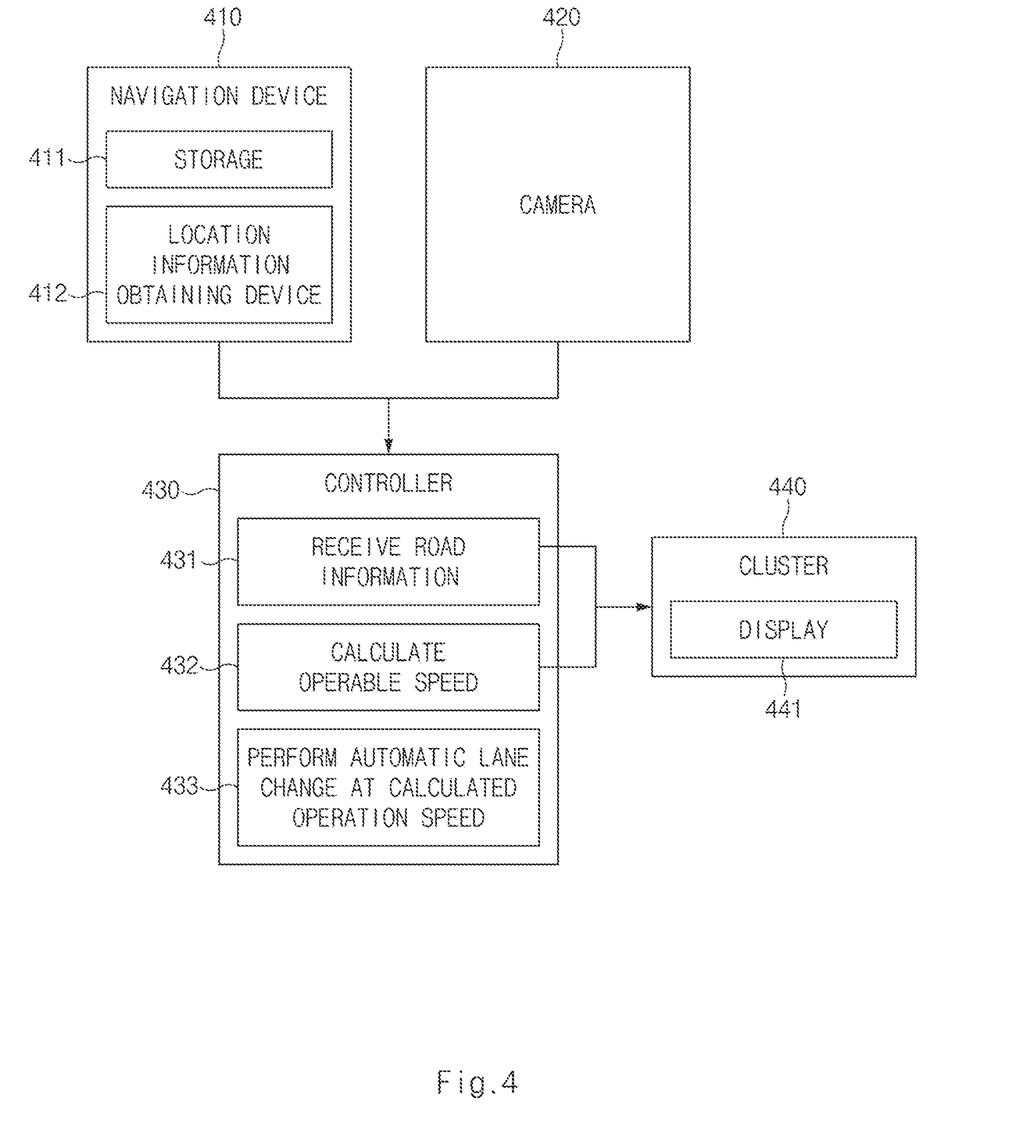
FIG. 4 is a block diagram illustrating the operations of configurations of an apparatus for controlling an automatic lane change according to an embodiment of the present disclosure.

FIG. 4 is a block diagram illustrating the operations of configurations of an apparatus for controlling an automatic lane change according to an embodiment of the present disclosure.

Referring to FIG. 4, a navigation device 410 may include storage 411 and a location information obtaining device 412.

As an example, the storage 411 may store map information including information on the speed limit of a road.

For example, the location information obtaining device 412 may obtain information on the location of the vehicle.

The navigation device 410 may be connected to a controller 430 to transmit various information to the controller 430.

A camera 420 may be provided in the vehicle to obtain an image around the vehicle.

The camera 420 may be connected to the controller 430 to transmit information about an image around the vehicle to the controller 430.

The controller 430 may receive road information in operation 431, calculate a speed at which the automatic lane change is operable in operation 432, and perform the automatic lane change at the calculated operable speed in operation 433.

For example, the controller 430 may receive road information from the navigation device 410 and the camera 420.

In this case, the road information may include information on the maximum speed limit of the road identified through map information and location information of the vehicle or information on the maximum speed limit of the road determined through an image around the vehicle.

As another example, the controller 430 may determine the maximum speed limit of the road through the map information and the vehicle location information received from the navigation device 410, or may determine the maximum speed limit of the road based on the sign of the surrounding image received from the camera 420.

For example, the controller 430 may calculate a speed at which the automatic lane change is operable based on the maximum speed limit of the road.

In particular, the controller 430 may calculate the minimum speed at which the automatic lane change is operable to comply with the laws and/or regulations of the relevant country or region based on the maximum speed limit of the road.

In addition, the controller 430 may perform the automatic lane change based on the calculated minimum speed at which the automatic lane change is possible.

As an example, the controller 430 may determine whether to perform the automatic lane change based on whether the current vehicle speed exceeds the calculated minimum speed at which the automatic lane change is operable.

As another example, when the current vehicle speed does not exceed the calculated minimum speed at which the automatic lane change is operable, the controller 430 may increase the vehicle speed and then perform the automatic lane change.

The controller 430 may transmit the received road information 431 and information about the speed 432 at which the automatic lane change is operable to a cluster 440 of the vehicle.

The cluster 440 of the vehicle may include a display 441.

The cluster 440 may display, through the display 441, the received road information 431, information about the speed 432 at which the automatic lane change is operable, the current speed of the vehicle or information about whether the automatic lane change is operable.

Figure 5:
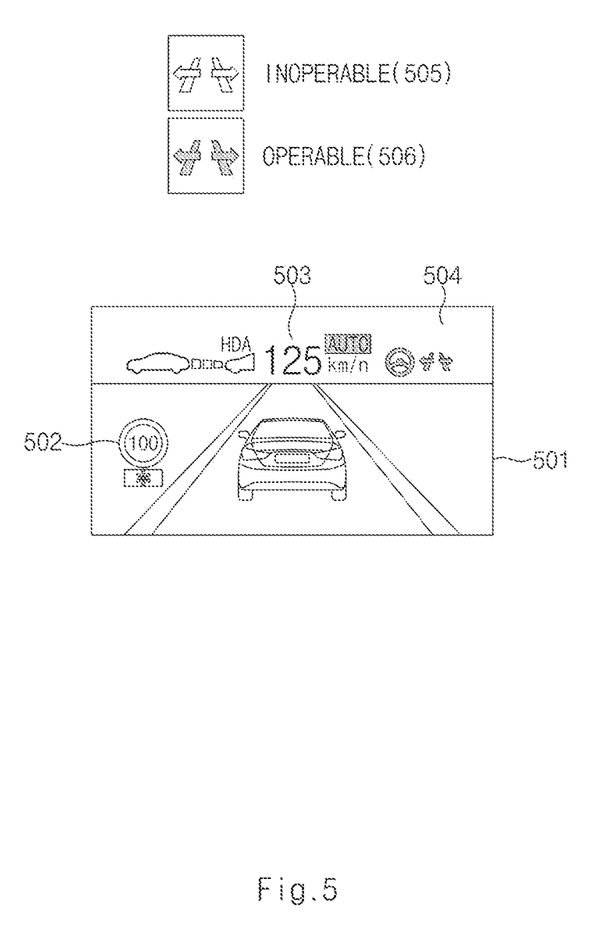
FIG. 5 is a diagram illustrating that an apparatus for controlling an automatic lane change according to an embodiment of the present disclosure displays, through a display, whether the determined automatic lane change function is operable.

FIG. 5 is a diagram illustrating that an apparatus for controlling an automatic lane change according to an embodiment of the present disclosure displays, through a display, whether the determined automatic lane change function is operable.

Referring to FIG. 5, the apparatus 100, 200 or 300 for controlling an automatic lane change may display various types of information on the automatic lane change of the vehicle through a display 501.

As an example, the apparatus 100, 200 or 300 for controlling an automatic lane change may display, through the display 501, information about a maximum speed limit 502 of the road on which the vehicle is traveling, a current driving speed 503 of the vehicle, and whether the automatic lane change is operable 504.

For example, the apparatus 100, 200 or 300 for controlling an automatic lane change may numerically indicate, through the display 501, information about the maximum speed limit 502 of the road on which the vehicle is traveling and the current driving speed 503 of the vehicle.

In addition, the apparatus 100, 200 or 300 for controlling an automatic lane change may display information on whether the automatic lane change is operable 504 through the display 501 as a symbol.

For example, the apparatus 100, 200 or 300 for controlling an automatic lane change may display whether the automatic lane change is operable 504 through a color of a symbol or whether the symbol is lightened.

As an example, when the automatic lane change cannot be operated 505, the apparatus 100, 200 or 300 for controlling an automatic lane change may allow the symbol indicating whether the automatic lane change is operable 504 not to be lightened. When the automatic lane change is operable 506, the apparatus 100, 200 or 300 for controlling an automatic lane change may allow the symbol indicating whether the automatic lane change is operable 504 to be lightened.

Figure 6:
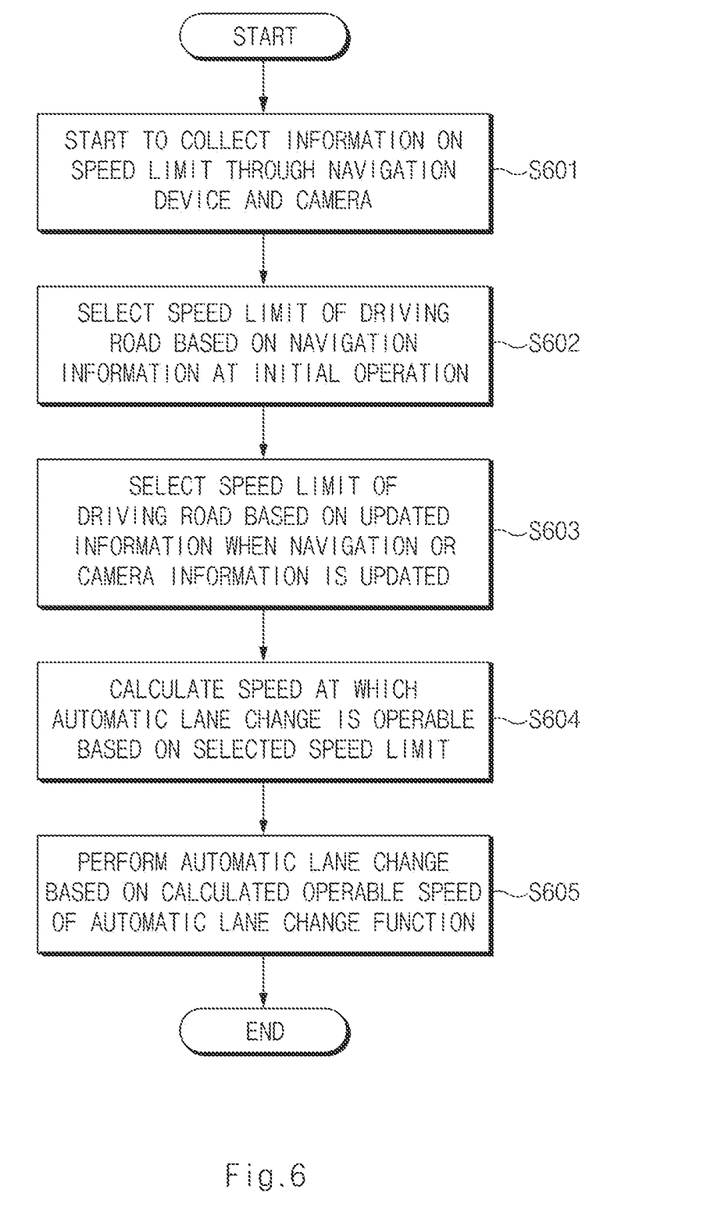
FIG. 6 is a flowchart illustrating the operation of an apparatus for controlling an automatic lane change according to an embodiment of the present disclosure.

FIG. 6 is a flowchart illustrating the operation of an apparatus for controlling an automatic lane change according to an embodiment of the present disclosure.

Referring to FIG. 6, in S601, the apparatus 100, 200 or 300 for controlling an automatic lane change may start to collect information about the speed limit of a road through a navigation device and a camera.

As an example, the apparatus 100, 200 or 300 for controlling an automatic lane change may collect map information and information on the current vehicle location through the navigation device, and collect information on surrounding images through the camera.

After starting to collect the information on the speed limit of the road through the navigation device and the camera in S601, in S602, the apparatus 100, 200 or 300 for controlling an automatic lane change may select the speed limit of the driving road based on the navigation information at the time of initial operation.

For example, when the apparatus 100, 200 or 300 for controlling an automatic lane change is first operated, the apparatus 100, 200 or 300 for controlling an automatic lane change may select the maximum speed limit of the road corresponding to the current vehicle location based on the map information obtained through the navigation device and the information on the current vehicle location.

After selecting the speed limit of the driving road based on the navigation information at the time of initial operation in S602, when the navigation or camera information is updated, in S603, the apparatus 100, 200 or 300 for controlling an automatic lane change may select the speed limit of the driving road based on the updated information.

For example, when the map information is updated from the server or the sign indicating the speed limit is recognized in the image acquired through the camera, the apparatus 100, 200 or 300 for controlling an automatic lane change may re-select the speed limit of the road based on the updated map information and the speed limit indicated on the sign.

After selecting the speed limit of the driving road based on the updated information in S603, in S604, the apparatus 100, 200 or 300 for controlling an automatic lane change may calculate the speed at which the automatic lane change function is operable based on the selected speed limit.

For example, the apparatus 100, 200 or 300 for controlling an automatic lane change may calculate the minimum speed at which the automatic lane change function is operable to comply with the law and/or regulation, based on the selected or reselected maximum speed limit of the road.

When calculating the minimum speed at which the automatic lane change function is operable based on the selected speed limit in S604, in S605, the apparatus 100, 200 or 300 for controlling an automatic lane change may perform the automatic lane change function based on the speed at which the automatic lane change function is operable.

For example, the apparatus 100, 200 or 300 for controlling an automatic lane change may perform the automatic lane change function based on the calculated minimum speed at which the automatic lane change function is operable.

For example, the apparatus 100, 200 or 300 for controlling an automatic lane change may perform the automatic lane change function based on whether the current speed of the vehicle exceeds the calculated minimum speed at which the automatic lane change function is operable.

Figure 7:
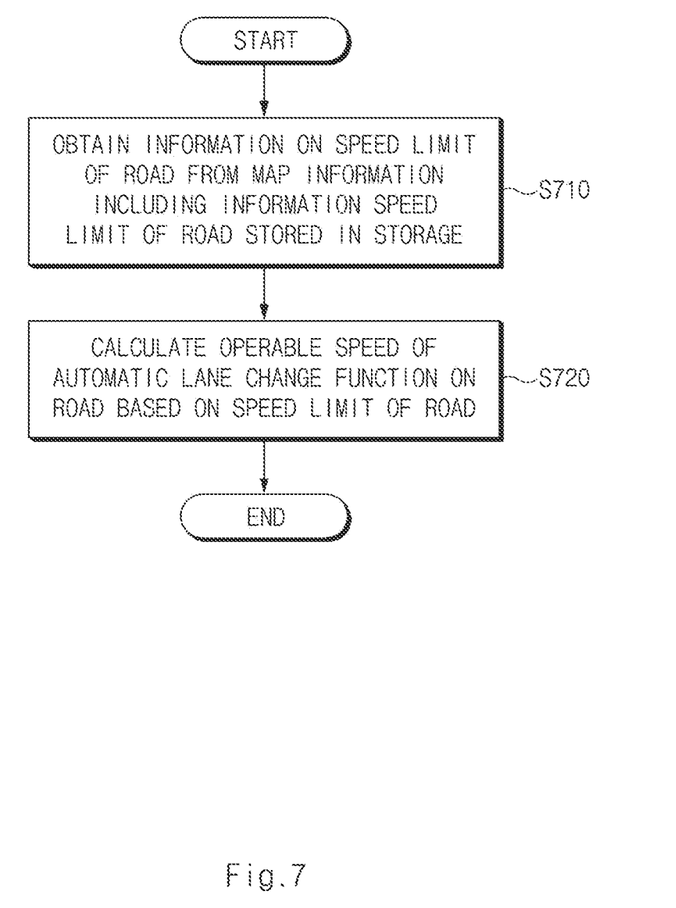
FIG. 7 is a flowchart illustrating a method of controlling an automatic lane change according to an embodiment of the present disclosure.

FIG. 7 is a flowchart illustrating a method of controlling an automatic lane change according to an embodiment of the present disclosure.

Referring to FIG. 7, a method of controlling an automatic lane change may include S710 of obtaining information about a speed limit of a road from map information including information about the speed limit of the road stored in storage, and S720 of calculating a speed at which an automatic lane change function is operable based on the speed limit of the road.

The S710 of obtaining information about a speed limit of a road from map information including information about the speed limit of the road stored in storage 110 or 210 may be performed by the controller 120 or 220.

The S720 of calculating a speed at which an automatic lane change function is operable based on the speed limit of the road may be performed by the controller 120 or 220.

For example, the method of controlling an automatic lane change may further include obtaining, by the location information obtaining device 230, information on a location of the vehicle, and controlling, by the controller 120 or 220, the automatic lane change based on the calculated speed at which the automatic lane change function is operable on the road corresponding to the location of the vehicle.

For example, the method of controlling an automatic lane change may further include displaying, by the controller 120 or 220, the speed limit of the road corresponding to the location of the vehicle through the display 250 provided in the vehicle.

For example, the method of controlling an automatic lane change may further include comparing, by the controller 120 or 220, a current speed of the vehicle with the calculated speed at which the automatic lane change function is operable on the road corresponding to the location of the vehicle, and determining whether the automatic lane change function is operable.

For example, the method of controlling an automatic lane change may further include displaying, by the controller 120 or 220, the determination of whether the automatic lane change function is operable, through the display 250 provided in the vehicle.

For example, the method of controlling an automatic lane change may further include obtaining, by the camera 240 provided in the vehicle, a surrounding image of the vehicle, and determining, by the controller 120 or 220, the speed limit of the road based on a sign recognized through the surrounding image.

For example, the calculating, by the controller 120 or 220, a speed at which an automatic lane change function is operable based on the speed limit of the road may include calculating, by the controller 120 or 220, the speed at which the automatic lane change function is operable on the road, based on the speed limit of the road corresponding to the map information when the controller is first operated, and recalculating, by the controller, the speed at which the automatic lane change function is operable on the road when information on the sign recognized through the surrounding image or the speed limit of the road corresponding to the map information is updated.

Accordingly, the processes of the method or algorithm described in relation to the embodiments of the present disclosure may be implemented directly by hardware executed by the processor, a software module, or a combination thereof. The software module may reside in a storage medium (that is, the memory and/or the storage), such as a RAM, a flash memory, a ROM, an EPROM, an EEPROM, a register, a hard disk, solid state drive (SSD), a detachable disk, or a CD-ROM.

The exemplary storage medium is coupled to the processor, and the processor may read information from the storage medium and may write information in the storage medium. In another method, the storage medium may be integrated with the processor. The processor and the storage medium may reside in an application specific integrated circuit (ASIC). The ASIC may reside in a user terminal. In another method, the processor and the storage medium may reside in the user terminal as an individual component.

The effects of the apparatus and method for controlling a vehicle lane change according to the present disclosure will be described as follows.

According to at least one of the embodiments of the present disclosure, it is possible to provide an apparatus and method for controlling an automatic lane change capable of controlling the automatic lane change of a vehicle in consideration of a speed limit.

In addition, according to at least one of the embodiments of the present disclosure, it is possible to provide an apparatus and method for controlling an automatic lane change capable of controlling the automatic lane change of a vehicle while automatically complying with laws and/or regulations in consideration of the maximum speed limit of the road.

In addition, according to at least one of the embodiments of the present disclosure, it is possible to provide an apparatus and method for controlling an automatic lane change capable of displaying, for a driver, the maximum speed limit of a road and the minimum operating speed capable of performing a lane change function determined in consideration of the maximum speed limit, such that the driver recognizes the change in the minimum operating speed.

In addition, according to at least one of the embodiments of the present disclosure, it is possible to provide an apparatus and method for controlling an automatic lane change capable of preventing a decrease in usability that may occur when the lane change function is performed without considering the maximum speed limit of a road.

In addition, various effects that are directly or indirectly understood through the present disclosure may be provided.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling an automatic lane change of a vehicle, the apparatus comprising:
   storage provided in the vehicle capable of performing the automatic lane change to store map information including information on a speed limit of a road;
   a camera provided in the vehicle to obtain a surrounding image of the vehicle; and
   a controller configured to:
      calculate a speed at which an automatic lane change function is operable for the road, based on the speed limit of the road, a deceleration of an approaching vehicle, a time from a time point when the lane change function starts to a time point when the deceleration of an approaching vehicle starts, a difference in the remaining time between vehicles after the approaching vehicle decelerates, and a reference value set by the vehicle manufacturer;
      determine the speed limit of the road based on a sign recognized through the surrounding image;
      calculate a speed at which the automatic lane change function is operable on the road, based on the speed limit of the road corresponding to the map information when being first operated;
      recalculate the speed at which the automatic lane change function is operable on the road when information on the sign recognized through the surrounding image or the speed limit of the road corresponding to the map information is updated, wherein the recalculated speed is based on the updated information on the sign or map information; and
      control the automatic lane change of the vehicle based on the calculated speed at which the automatic lane change function is operable on the road.

2. The apparatus of claim 1, further comprising:
   a location information obtaining device configured to obtain information on a location of the vehicle,
   wherein the controller is configured to control the automatic lane change of the vehicle based on the calculated speed at which the automatic lane change function is operable on the road corresponding to the location of the vehicle.

3. The apparatus of claim 2, further comprising:
   a display provided in the vehicle,
   wherein the controller is configured to display the speed limit of the road corresponding to the location of the vehicle through the display.

4. The apparatus of claim 2, wherein the controller is configured to compare a current speed of the vehicle with the calculated speed at which the automatic lane change function is operable on the road corresponding to the location of the vehicle, and determine whether the automatic lane change function is operable.

5. The apparatus of claim 4, further comprising:
   a display provided in the vehicle,
   wherein the controller is configured to display, through the display, the determination of whether the automatic lane change function is operable.

6. An apparatus for controlling an automatic lane change of a vehicle, the apparatus comprising:
   a camera provided in the vehicle capable of performing the automatic lane change to obtain a surrounding image of the vehicle; and
   a controller configured to:
      recognize a speed limit of a road on which the vehicle travels based on a sign recognized through the surrounding image,
      calculate a speed at which an automatic lane change function is operable on the road based on the speed limit of the road corresponding to map information when being first operated, a deceleration of an approaching vehicle, a time from a time point when the lane change function starts to a time point when the deceleration of an approaching vehicle starts, a difference in the remaining time between vehicles after the approaching vehicle decelerates, and a reference value set by the vehicle manufacturer;

recalculate the speed at which the automatic lane change function is operable on the road when information on the sign recognized through the surrounding image or the speed limit of the road corresponding to the map information is updated, wherein the recalculated speed is based on the updated information on the sign or map information; and control the automatic lane change of the vehicle based on the calculated speed at which the automatic lane change function is operable on the road.

7. The apparatus of claim 6, further comprising:
a display provided in the vehicle,
wherein the controller is configured to display the speed limit of the road through the display.

8. The apparatus of claim 6, wherein the controller is configured to compare a current speed of the vehicle with the calculated speed at which the automatic lane change function is operable on the road, and determine whether the automatic lane change function is operable.

9. The apparatus of claim 8, further comprising:
a display provided in the vehicle,
wherein the controller is configured to display, through the display, the determination of whether the automatic lane change function is operable.

10. A method of controlling an automatic lane change of a vehicle, the method comprising:
obtaining, by a controller, information about a speed limit of a road from map information including information about the speed limit of the road stored in storage, wherein the controller is provided in the vehicle capable of performing the automatic lane change;
obtaining, by a camera provided in the vehicle, a surrounding image of the vehicle;
calculating, by the controller, a speed at which an automatic lane change function is operable based on the speed limit of the road, a deceleration of an approaching vehicle, a time from a time point when the lane change function starts to a time point when the deceleration of an approaching vehicle starts, a difference in the remaining time between vehicles after the approaching vehicle decelerates, and a reference value set by the vehicle manufacturer;

determining, by the controller, the speed limit of the road based on a sign recognized through the surrounding image; and controlling, by the controller, the automatic lane change of the vehicle based on the calculated speed at which the automatic lane change function is operable on the road;

wherein the calculating of the speed at which an automatic lane change function is operable based on the speed limit of the road includes:

calculating, by the controller, the speed at which the automatic lane change function is operable on the road, based on the speed limit of the road corresponding to map information when the controller is first operated; and recalculating, by the controller, the speed at which the automatic lane change function is operable on the road when information on the sign recognized through the surrounding image or the speed limit of the road corresponding to the map information is updated, wherein the recalculated speed is based on the updated information on the sign or map information.

11. The method of claim 10, further comprising:
obtaining, by a location information obtaining device, information on a location of the vehicle; and
controlling, by the controller, the automatic lane change of the vehicle based on the calculated speed at which the automatic lane change function is operable on the road corresponding to the location of the vehicle.

12. The method of claim 11, further comprising:
comparing, by the controller, a current speed of the vehicle with the calculated speed at which the automatic lane change function is operable on the road corresponding to the location of the vehicle, and determining whether the automatic lane change function is operable.

13. The method of claim 12, further comprising:
displaying, by the controller, the determination of whether the automatic lane change function is operable, through a display provided in the vehicle.

14. The method of claim 10, further comprising:
displaying, by the controller, the speed limit of the road corresponding to a location of the vehicle through a display provided in the vehicle.

* * * * *